US008531948B2

(12) United States Patent
Babiarz

(10) Patent No.: US 8,531,948 B2
(45) Date of Patent: Sep. 10, 2013

(54) TECHNIQUE FOR ADMISSION CONTROL OF PACKET FLOWS

(75) Inventor: Jozef Babiarz, Stittsville (CA)

(73) Assignee: Rockstar Consortium US LP, Plano, TX (US)

( * ) Notice: Subject to any disclaimer, the term of this patent is extended or adjusted under 35 U.S.C. 154(b) by 100 days.

(21) Appl. No.: 13/269,667

(22) Filed: Oct. 10, 2011

(65) Prior Publication Data
US 2012/0026876 A1 Feb. 2, 2012

Related U.S. Application Data

(63) Continuation of application No. 10/779,703, filed on Mar. 15, 2004, now Pat. No. 8,036,120.

(60) Provisional application No. 60/497,932, filed on Aug. 27, 2003.

(51) Int. Cl.
*H04L 12/26* (2006.01)

(52) U.S. Cl.
USPC .......................................................... 370/230

(58) Field of Classification Search
None
See application file for complete search history.

(56) References Cited

U.S. PATENT DOCUMENTS

| 6,483,805 B1 * | 11/2002 | Davies et al. | 370/235 |
| 6,625,118 B1 * | 9/2003 | Hadi Salim et al. | 370/229 |
| 7,035,220 B1 * | 4/2006 | Simcoe | 370/236 |

OTHER PUBLICATIONS

Naotaka Morita, "Measurable Forwarding: A New per-Hop Behavior (PHB)" TSV working group, Internet Draft, NTT Corporation, Oct. 2003, 1-19.
Naotaka Morita, "Verification Scenarios for Measurable Forwarding PHB (Per-Hop Behavior)" TSV working group, Internet Draft, NTT Corporation, Oct. 2003, 1-7.
Naotaka Morita, Gunnar Karlsson "Framework of Priority Promotion Scheme draft-morita-tsvwg- pps-00" TSVWG, Internet Draft, NTT Corporation, Jun. 23, 2003, 1-20.
Naotaka Morita, NTT Corporation, Gunnar Karlsson, KTH, "Framework of Priority Promotion Scheme" TSV working group, Internet Draft, Oct. 2003, 1-18.
Shunsuke Mori et al., "Priority Promotion Scheme (PPS)—An Autonomous and Distributed Admission Control for End-to-End Quality Service for Interactive Multimedia Services" NTT Technical Review, vol. 2 No. 10, Oct. 2004, 22-27.
Naotaka Morita, NTT Network Service Systems Labs., Gunnar Karlsson, KTH, "Framework of Priority Promotion Scheme (PPS) draft-morita-tsvwg-pps-00" TSVWG, Internet Draft, Jul. 18, 2003, 1-20.

* cited by examiner

*Primary Examiner* — Raj Jain
(74) *Attorney, Agent, or Firm* — Christopher & Weisberg, P.A.

(57) ABSTRACT

A technique for admission control of packet flows is disclosed. In one particular exemplary embodiment, the technique may be realized as a method for admission control of packet flows in a network. The method may comprise determining at least one flow rate associated with a plurality of packets. The method may also comprise marking at least one predetermined bit in at least one of the plurality of packets if the at least one flow rate is greater than a predetermined rate. The method may further comprise controlling an admission of additional packets into the network based at least in part on the marking of the at least one predetermined bit in the at least one of the plurality of packets.

54 Claims, 8 Drawing Sheets

TECHNIQUE FOR ADMISSION CONTROL OF PACKET FLOWS

CROSS-REFERENCE TO RELATED APPLICATIONS

This patent application is a continuation of U.S. patent application Ser. No. 10/799,703 filed Mar. 15, 2004 now U.S. Pat. No. 8,036,120 which claims priority to U.S. Provisional Patent Application No. 60/497,932, filed Aug. 27, 2003, which is hereby incorporated by reference herein in its entirety.

FIELD OF THE INVENTION

The present invention relates generally to computer and communications network and, more particularly, to a technique for admission control of packet flows.

BACKGROUND OF THE INVENTION

In recent years, voice over IP (VoIP) has become a new standard for voice communications due to the ubiquity of Internet Protocol (IP) networks. Compared with traditional telephonic technology, VoIP offers the benefits of cost savings, open standards, multi-vendor interoperability, and integrated voice and data networks. Other real-time applications include, for example, video-conferencing, multimedia streaming and other multimedia services that require guaranteed quality of service (QoS), all of which may benefit from the technique for admission control of packet flows in accordance with the present invention.

Compared with traditional telephonic technology, VoIP also has its own difficulties. Traditionally voice communications have been carried over the public switched telephone network (PSTN), a circuit-switched network that can ensure the quality of each call through dedicated bandwidth allocations. This consistently high level of voice quality is called "toll quality." Unlike PSTN, IP networks are based on packet switching rather than circuit switching. Packet switching works well for data communications because it maximizes bandwidth utilization by allowing all users to dynamically share network bandwidth. However, traditional packet switching techniques do not adequately recognize the mixing of many different applications that have different traffic flow characteristics and performance requirements in one network or link. For example, real-time applications typically require minimum delay, low packet loss (or guaranteed bandwidth), whereas non-real-time application may be able to tolerate longer delays and recover from packet loss. Though telephony service, video-conferencing and one-way multimedia streaming are real-time applications, the last two are more bandwidth-demanding.

Some providers employ bandwidth management techniques such as prioritization to ensure that VoIP and other real-time multimedia applications get what they need. However, bandwidth management alone simply allocates bandwidth to critical applications at the expense of other applications and does not limit or prevent real-time applications from congesting a link to a point where the performance or quality of service offered for all real-time flows become unacceptable. Some providers or enterprises over-provision their network capacity so that application demands would never hit the bandwidth limit. This solution is not economical since it may require expensive upgrades to the carrier networks to meet the increasing peak demands for bandwidth. None of the existing solutions can prevent network congestion in an efficient and cost-effective manner and still provide high quality of service for real-time flows.

In view of the foregoing, it would be desirable to provide a solution which overcomes the above-described inadequacies and shortcomings.

SUMMARY OF THE INVENTION

According to the present invention, a technique for admission control of packet flows is provided. In one particular exemplary embodiment, the technique may be realized as a method for admission control of packet flows in a network. The method may comprise determining at least one flow rate associated with a plurality of packets. The method may also comprise marking at least one predetermined bit in at least one of the plurality of packets if the at least one flow rate is greater than a predetermined rate. The method may further comprise controlling an admission of additional packets into the network based at least in part on the marking of the at least one predetermined bit in the at least one of the plurality of packets.

In accordance with other aspects of this particular exemplary embodiment of the present invention, the network may comprise a plurality of network elements, and the at least one flow rate may be determined at a first network element, where the first network element is part of an access link of the network.

In accordance with further aspects of this particular exemplary embodiment of the present invention, the at least one of the plurality of packets may comprise at least one signaling packet. The at least one signaling packet may originate from an end terminal outside the network. Information associated with the at least one predetermined bit in the at least one signaling packet may be communicated to the end terminal. And the end terminal may echo information associated with the at least one predetermined bit in the at least one signaling packet in a transmission to the network.

In accordance with still further aspects of this particular exemplary embodiment of the present invention, the method may further comprise denying the admission of the additional packets into the network if the at least one predetermined bit in the at least one of the plurality of packets is marked.

In accordance with additional aspects of this particular exemplary embodiment of the present invention, the admission of the additional packets into the network may be controlled by an entity that controls the network. The admission of the additional packets may be based at least in part on priorities or importance of the plurality of packets and the additional packets.

In accordance with another aspect of this particular exemplary embodiment of the present invention, the plurality of packets may comprise real-time packets. The plurality of packets may comprise Internet Protocol (IP) packets, including voice over IP (VoIP) packets. And the at least one predetermined bit may be part of a Differentiated Services field in an IP header of the at least one of the plurality of packets.

In accordance with yet another aspect of this particular exemplary embodiment of the present invention, the predetermined rate may be based on a network bandwidth allocated for the plurality of packets. And the predetermined rate may be raised to a value above the allocated network bandwidth for a predetermined period of time.

In another particular exemplary embodiment, the technique may be realized by at least one signal embodied in at least one carrier wave for transmitting a computer program of instructions configured to be readable by at least one processor for instructing the at least one processor to execute a computer process for performing the method as recited above.

In yet another particular exemplary embodiment, the technique may be realized by at least one processor readable carrier for storing a computer program of instructions configured to be readable by at least one processor for instructing the at least one processor to execute a computer process for performing the method as recited above.

In still another particular exemplary embodiment, the technique may be realized by a system for admission control of packet flows. The system may comprise duplicating at least one network element that determines at least one flow rate associated with a plurality of packets, and marks at least one predetermined bit in at least one of the plurality of packets if the at least one flow rate is greater than a predetermined rate. The system may further comprise an admission control module that controls an admission of additional packets into the network based at least in part on the marking of the at least one predetermined bit in the at least one of the plurality of packets.

In a further particular exemplary embodiment, the technique may be realized by a system for admission control of packet flows. The system may comprise means for determining at least one flow rate associated with a plurality of packets. The system may also comprise means for marking at least one predetermined bit in at least one of the plurality of packets if the at least one flow rate is greater than a predetermined rate. The system may further comprise means for controlling an admission of additional packets into the network based at least in part on the marking of the at least one predetermined bit in the at least one of the plurality of packets.

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

DETAILED DESCRIPTION OF EXEMPLARY EMBODIMENT(S)

For illustration purposes, the technique for admission control of packet flows in accordance with the present invention will be described below with specific reference to voice over IP (VoIP) packet flows under current version of Internet Protocol (IPv4). However, it should be appreciated that the technique is applicable to any real-time packet flows such as voice, video, data and combinations thereof. The technique is also applicable to future versions of Internet Protocol including IPv6.

Figure 1:
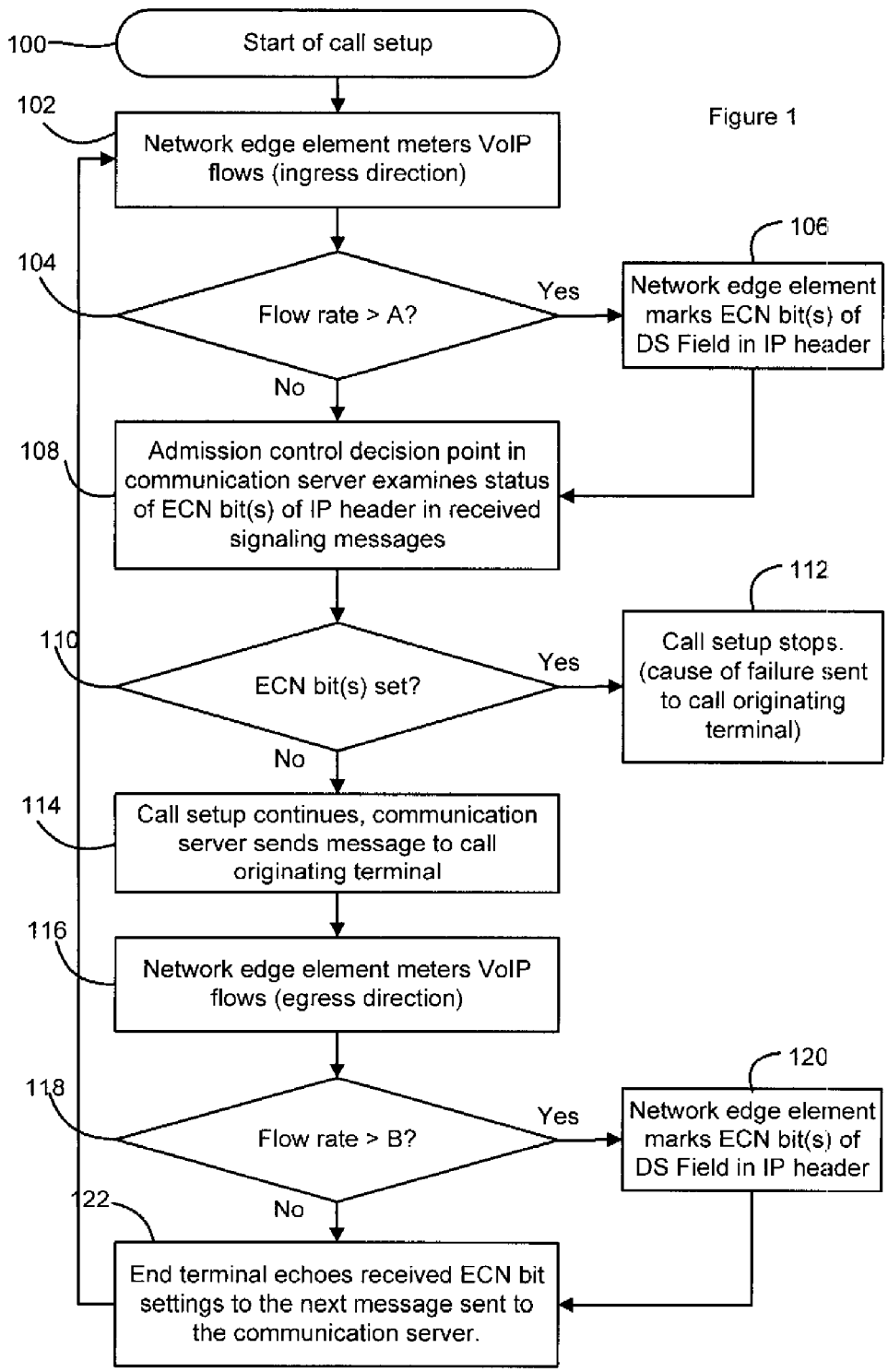
FIG. 1 is a flow chart illustrating an exemplary method for admission control of packet flows in accordance with an embodiment of the present invention.

Referring to FIG. 1, there is shown a flow chart illustrating an exemplary method for admission control of packet flows in accordance with an embodiment of the present invention.

In step 100, a first end terminal (VoIP terminal at call originating end) may initiate a call to a second end terminal (VoIP terminal at call terminating end). The call setup may be started by using a number of standardized and/or customized signaling methods, such as Nortel Networks UniStim Interface Protocol (UNISTIM), Media Gateway Control Protocol (MGCP), Session Initiation Protocol (SIP), Automated System for Performance Evaluation of Networks (ASPEN), and the International Telecommunication Union (ITU) defined H.248 or H.323 standards can be used.

In step 102, a network edge element may meter a flow of VoIP packets entering the network (i.e., ingress flow). A network edge element may be any network element, such as a router, switch or middle-box, located on or near the edge of a computer and/or communications network. The edge element may be part of an access port or access link through which VoIP packets flow into and/or out of the network.

Figure 2:
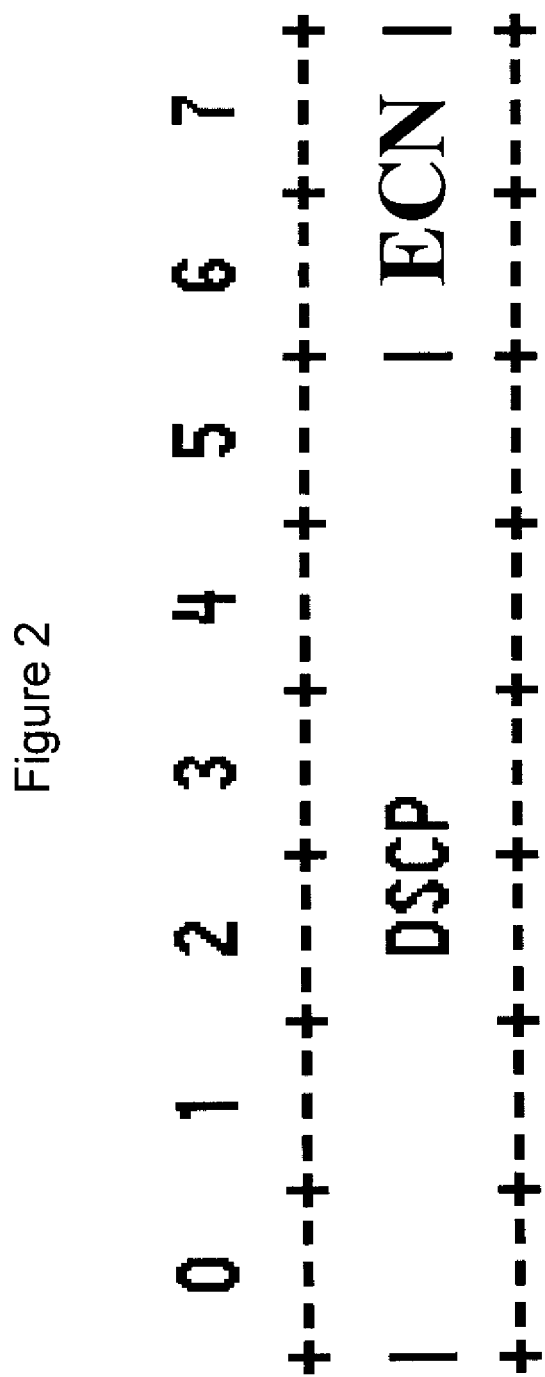
FIG. 2 is a diagram illustrating the DiffServ Field in an IPv4 packet header in accordance with an embodiment of the present invention.

VoIP packet flows typically include two types of packets: signaling packets and payload packets. The signaling packets carry call-control messages that are used to set up and manage connections between VoIP terminals. The payload packets carry the digitally encoded voice conversations. According to one embodiment of the invention, the signaling packets and payload packets may be transmitted using different Differentiated Services Code Points (DSCP). In IPv4, the Differentiated Services (DiffServ or DS) model defines different service class levels for different real-time packets. FIG. 2 is a diagram illustrating the DiffServ Field in an IPv4 packet in accordance with an embodiment of the present invention. The six most significant bits (MSBs) of the DiffServ Field, also known as Differentiated Services Code Point (DSCP), serve as an indication of the packet's required service class level. The two least significant bits (LSEs) are reserved as Explicit Congestion Notification (ECN) bits. According to an embodiment of the invention, a specific service class may be used for VoIP traffic. For example, Expedited Forwarding (EF) DSCP may be used to mark VoIP payload and CS5 DSCP may be used for signaling. Packets marked with both DSCP values may be forwarded using the same service class.

A DiffServ style traffic conditioner, which is capable of metering VoIP flows and marking the ECN bit(s) of DS Field in IP headers, may be implemented on the network edge element. For example, a sum of EF and CS5 marked packets may be metered for a predetermined period of time. As a result, a flow rate may be determined. The flow rate may be measured for ingress flows and/or egress flows. An ingress flow rate is an indication of the uplink bandwidth usage, and an egress flow rate is an indication of the downlink bandwidth usage.

In step 104, it may be determined whether the ingress flow rate is greater than a predetermined maximum rate "A." The maximum rate "A" may be a predetermined portion of a total bandwidth allocated for VoIP applications. For example, if an access link has 10 Mbps bandwidth, 1.5 Mbps of which is allocated for VoIP service, the maximum rate "A" may be 1.5 Mbps, with the remaining 8.5 Mbps allocated for other traffic. Emergency "911" calls may be allowed to borrow for short period of time bandwidth that was allocated for other traffic, therefore total of normal and emergency VoIP flows may exceed the 1.5 Mbps rate.

If the flow rate exceeds "A," the uplink is congested (uplink has reached the bandwidth limit for VoIP flows). Then the network edge element may, in step 106, mark the ECN bit(s) in the IP headers of the signaling packets flowing into the network. The signaling packets may be those sent by the first end terminal to set up new Internet calls. The signaling packets may be part of an ingress flow coming into the network. According to embodiments of the invention, the ECN bit(s) may be encoded by the network edge elements to convey a status of bandwidth usage in the access link. For example, Bit 7 of the DiffServ Field may be set to indicate that the access link is congested with VoIP traffic. Or both ECN bits, i.e., Bit 6 and Bit 7, may be encoded to indicate levels of congestion in the access link.

According to embodiments of the invention, the method of marking or encoding ECN bit(s) may be extended to data fields other than the ECN bits or the DS Field. Depending on the desired application and the specific signaling method, other predetermined bit(s) in the signaling packets may be marked or encoded to convey the bandwidth usage status. Nor is this method limited to signaling packets. Other types of packets, such as control packets and payload packets may also serve the same or similar purpose. For example, the predetermined bits may be in the IP header, UDP header, RTP header, or payload header of the packet that is used to convey the bandwidth usage status.

In step 108, an admission control decision point may examine the ECN bit(s) in the signaling packets it receives. An admission control decision point may be a communication server or some other server in the network, for example. For each signaling packet it receives, the admission control decision point in a communication server may determine, in step 110, whether the ECN bits have been marked. If so, the decision point may, in step 112, stop the call setup process and may also send cause of failure to the VoIP terminal at call originating end.

If, in step 110, it is determined that the ECN bits of the signaling packets are not marked, call setup may continue in step 114. The communication server may next send message(s) to the call originating terminal.

In step 116, the network edge element may meter a flow of VoIP packets exiting the network (i.e., egress flow). In step 118, it is determined whether the egress flow rate is greater than a predetermined maximum rate "B." If so, the downlink is congested. Then, in step 120, the network edge element may mark the ECN bit(s) of DS Fields in the signaling message(s) which was sent from the communication server. If the egress flow rate is no more than the predetermined maximum, the ECN bit(s) in the signaling message(s) will not be marked.

In step 122, as the message(s) reach the call originating terminal, the ECN bit settings in the message(s) are echoed in the subsequent messages that are sent to the communication server. These messages will again pass through the network edge element on their way to the communication server. As depicted in steps 102 through 106, the network edge element will mark the appropriate ECN bit(s) if it meters a VoIP flow rate greater than the predetermined maximum. And these ECN bits will be examined by the admission control decision point in the communication server to determine the bandwidth status on the access link. Whether the ECN bits have been marked in step 120 or in step 106, the admission control decision point will be notified and will be able to take appropriate measures to continue or to end the call setup. If the ECN bits are not marked, the communication server may continue the call setup process.

Figure 4:
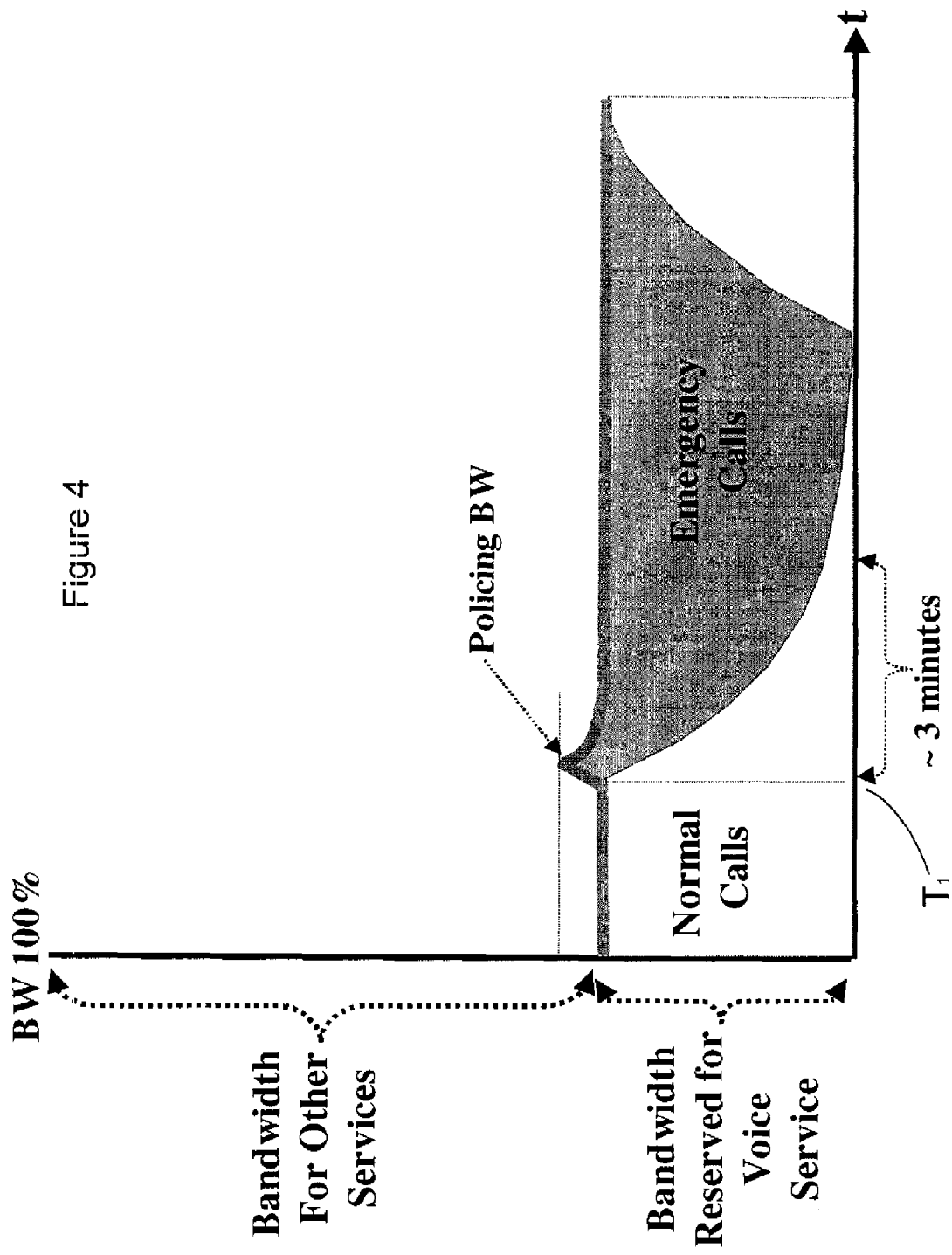
FIG. 4 is an exemplary bandwidth diagram in accordance with an embodiment of the present invention.

According to embodiments of the invention, new emergency calls may still be allowed even when normal calls are denied access to the network. In fact, a network implementing the method for admission control of packet flows may oversubscribe VoIP calls for a certain period of time without negative impact to an overall performance of the network. An exemplary bandwidth diagram illustrating temporary oversubscription is shown in FIG. 4. In this exemplary diagram, a total bandwidth of the network is divided into two parts. One part is allocated for real-time traffic such as VoIP and videotelephony and is forwarded by a separate service or forwarding class. The rest of the bandwidth is allocated for traffic in other service or forwarding classes. In practice, a combination of normal calls and emergency calls may be allowed to use more bandwidth than what is allocated for voice traffic, up to the policing bandwidth. For example, up till time $T_1$ the network may have been servicing normal calls using all the bandwidth allocated for voice traffic. Then, a number of emergency calls may request setup. Instead of dropping ongoing normal calls to make bandwidth available for emergency calls, the network may stop admitting additional normal calls and use a portion of the bandwidth from other service classes to service the incoming emergency calls. Within approximately three minutes, which is the average length of normal calls, a number of voice calls will terminate normally, freeing up significant portion of bandwidth in the voice service class. After then, emergency calls may be allowed to take up most or all of the bandwidth allocated for voice service class.

Figure 3:
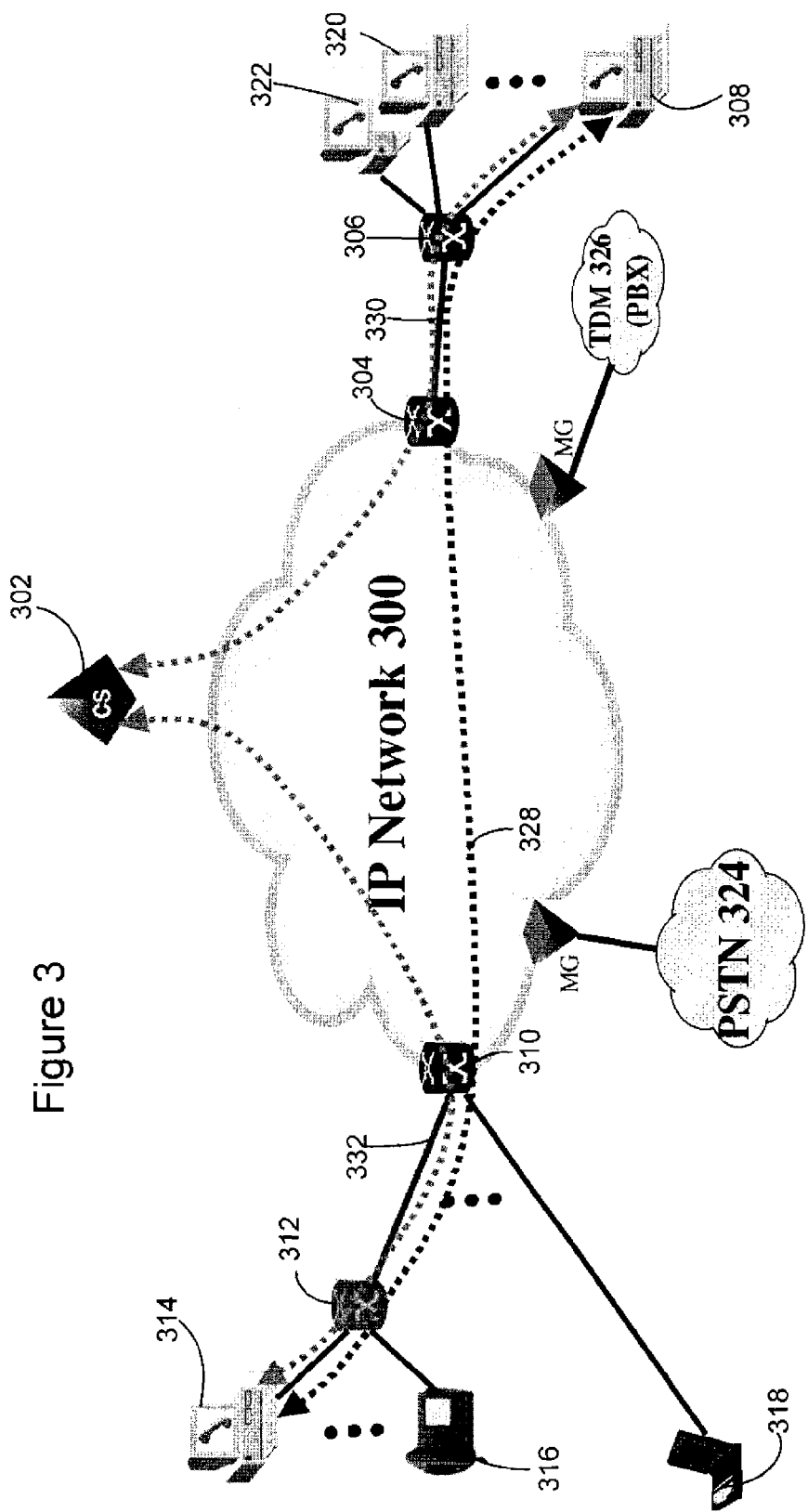
FIG. 3 is a block diagram illustrating an exemplary system for admission control of packet flows in accordance with an embodiment of the present invention.

FIG. 3 is a block diagram illustrating an exemplary system for admission control of packet flows in accordance with an embodiment of the present invention. The system may comprise a plurality of network edge elements (e.g., Router 304, Router 306, Router 310 and Router 312) located on or near the edge of an IP Network 300. The system may further comprise a Communication Server 302 serving as an admission control decision point in this particular embodiment. Routers 304, 306, 310 and 312 serve as part of a bearer (payload) connection path 328 between end terminals 308 and 314. There are also other end terminals (316, 318, 320 and 322) that are served by these routers. IP Network 300 is also connected to a public switched telephone network (PSTN) 324 and a Time-Division Multiplexing (TDM) network 326 through their respective media gateways. A connection 330 between Routers 304 and 306 serves as an access link for end terminals 308, 320 and 322. A connection 332 between Routers 310 and 312 serves as an access link for end terminals 314 and 316.

In order to initiate a VoIP call to end terminal 308, end terminal 314 may send signaling packets through access link 332 to Communication Server 302. Either Router 312 or Router 310 or both may be monitoring packet flows into and out of IP Network 300. For example, if Router 310 meters a flow rate that is greater than a predetermined maximum rate for regular calls, it may mark the ECN bit(s) in the signaling packets sent by end terminal 314. As Communication Server 302 receives the signaling packets, it may examine their ECN bit(s). If it identifies marked signaling packets from Router 310, Communication Server 302 may stop admitting new calls, with the exception of "911" and other emergency calls. Communication Server 302 may also send call-failure notifications to the end terminal 314. If sufficient bandwidth has been verified on the access link 332, a similar verification process may take place on access link 330 which is on the receiving side of the IP Network 300.

As mentioned above, the method for admission control of packet flows in accordance with the present invention may be implemented to verify bandwidth availability for either an uplink or a downlink on both the call originating end and the call terminating end. For a better understanding of the different scenarios, a few examples are described below in connection with FIGS. 5 through 8.

The examples illustrated in FIGS. 5 through 8 are based on one possible implementation of the Session Initiation Protocol (SIP).

In each of FIGS. 5 through 8, there is schematically shown an End Terminal 1 at the call originating end, an Edge Router I, a Communication Server 500, an Edge Router E and an End Terminal 2 at the call terminating end.

Figure 5:
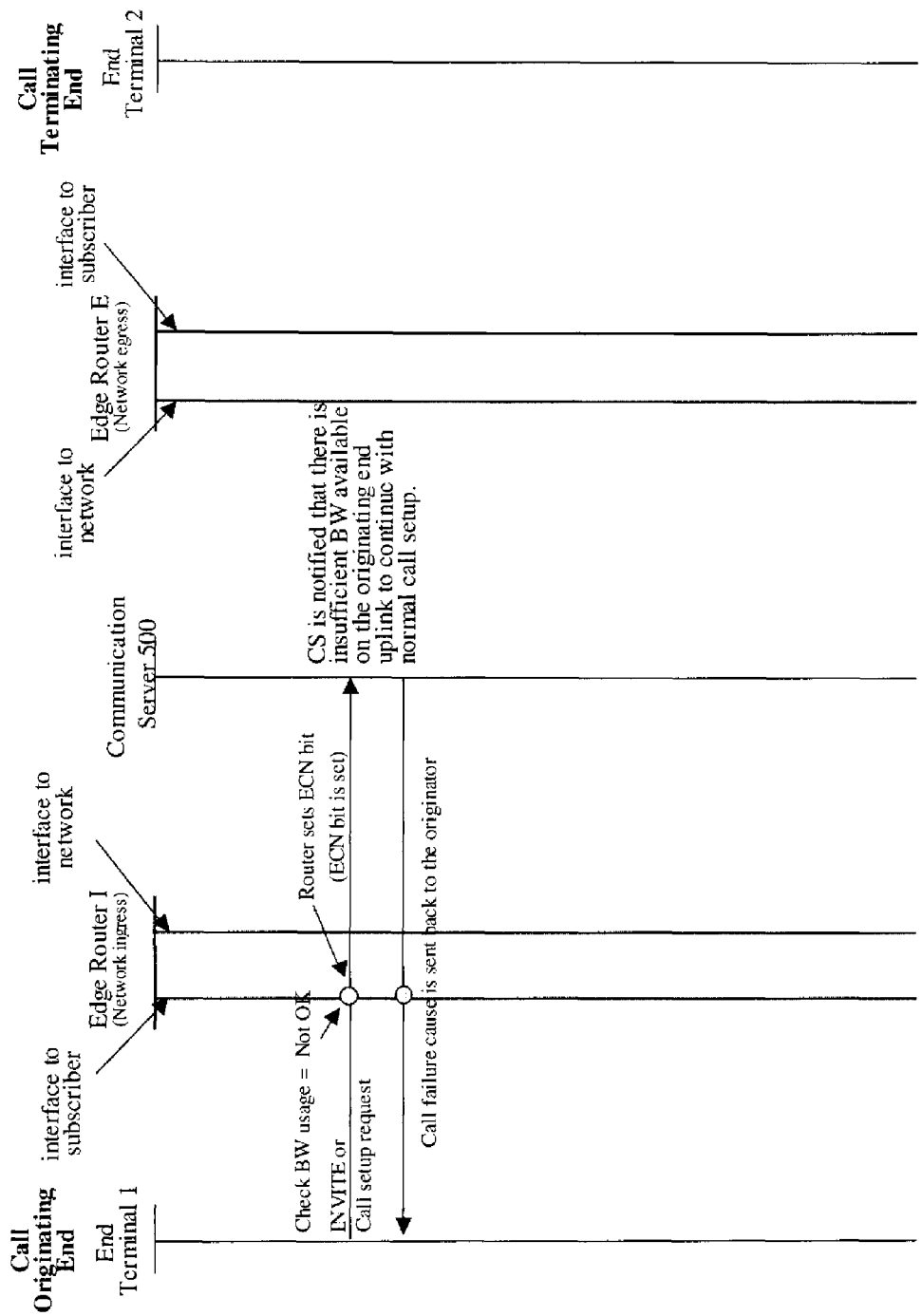
FIG. 5 is a schematic illustration of an admission control scenario in accordance with an embodiment of the present invention.

FIG. 5 illustrates a scenario where the uplink is congested on the call originating end. To initiate a call to End Terminal 2, End Terminal 1 may transmit INVITE or call-setup request message to Communication Server 500. The signaling packets may be marked with CS5 DSCP value. Edge Router I may be monitoring network ingress flows on its interface to the subscriber. If the network ingress (uplink) flow rate exceeds a predetermined maximum rate, Edge Router I may mark the ECN bit(s) in the signaling packets sent by End Terminal 1. When Communication Server 500 receives these signaling packets, it may examine the ECN bits. If the ECN bits are marked, Communication Server 500 is notified that there is insufficient bandwidth available on the uplink of the call originating end to admit normal calls. As a result, Communication Server 500 may stop the call setup process for normal (non emergency "911") calls. The call failure cause may be sent to End Terminal 1.

Figure 6:
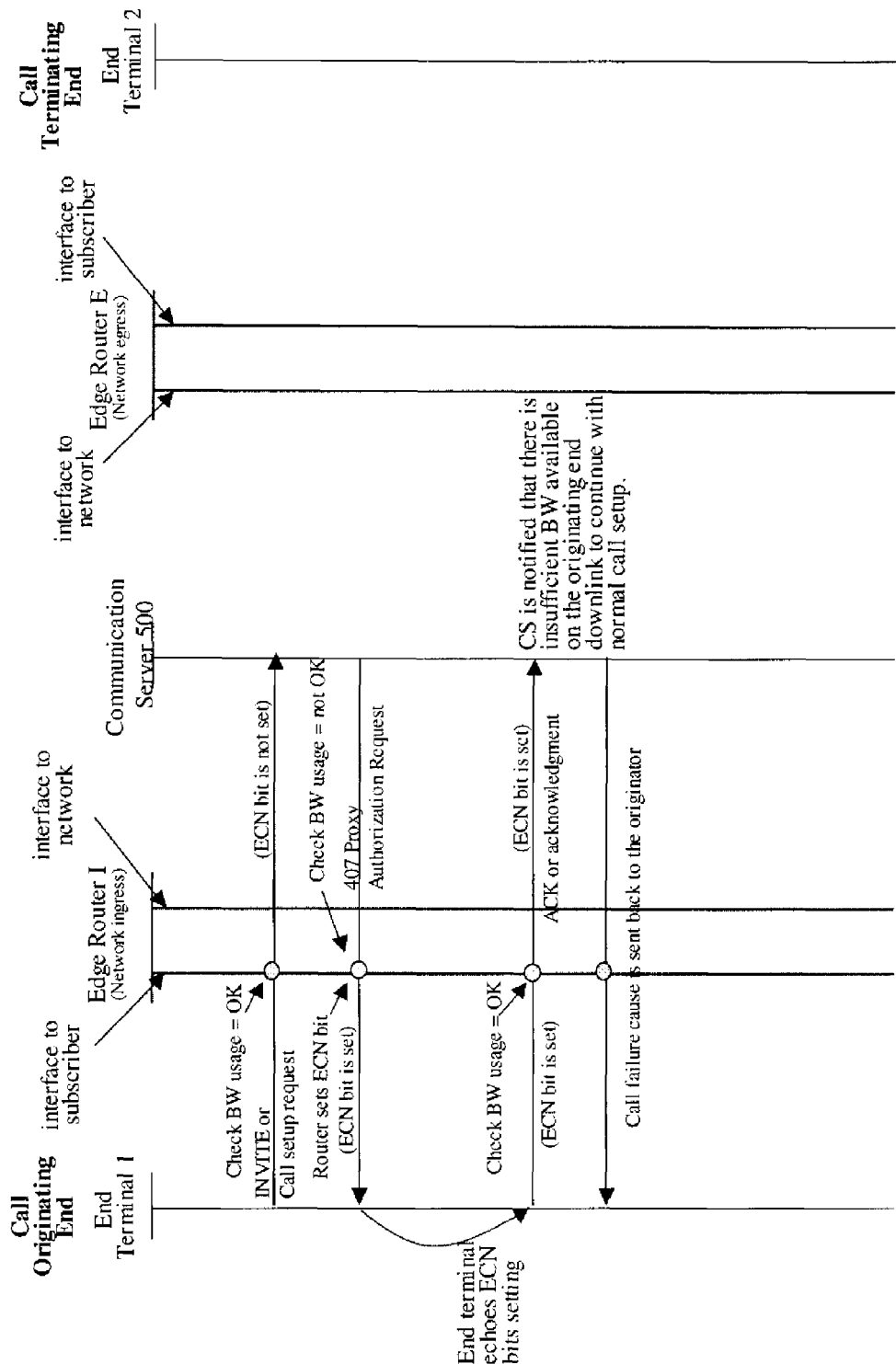
FIG. 6 is a schematic illustration of another admission control scenario in accordance with an embodiment of the present invention.

FIG. 6 illustrates a scenario where the downlink is congested on the call originating end. Edge Router I may monitor not only ingress flows but also egress flows on its interface to the subscriber. If the ingress flow rate is below the predetermined maximum rate, the signaling packets may flow through without being marked. When these signaling packets have been processed by Communication Server 500, Server 500 may send 407 Proxy Authorization Request messages through Edge Router I back to End Terminal 1. If Edge Router A measures an egress flow rate that exceeds the predetermined maximum rate, it may mark the ECN bits in 407 message. End Terminal 1 may echo the ECN bit settings in the 407 message it receives, so that the ACK message it subsequently sends will bear the same ECN bit settings. Upon examining these ACK message with marked ECN bits, Communication Server 500 is notified of the insufficient bandwidth on the downlink. Action may then be taken to stop call setup and the call failure cause may be sent to End Terminal 1.

Figure 7:
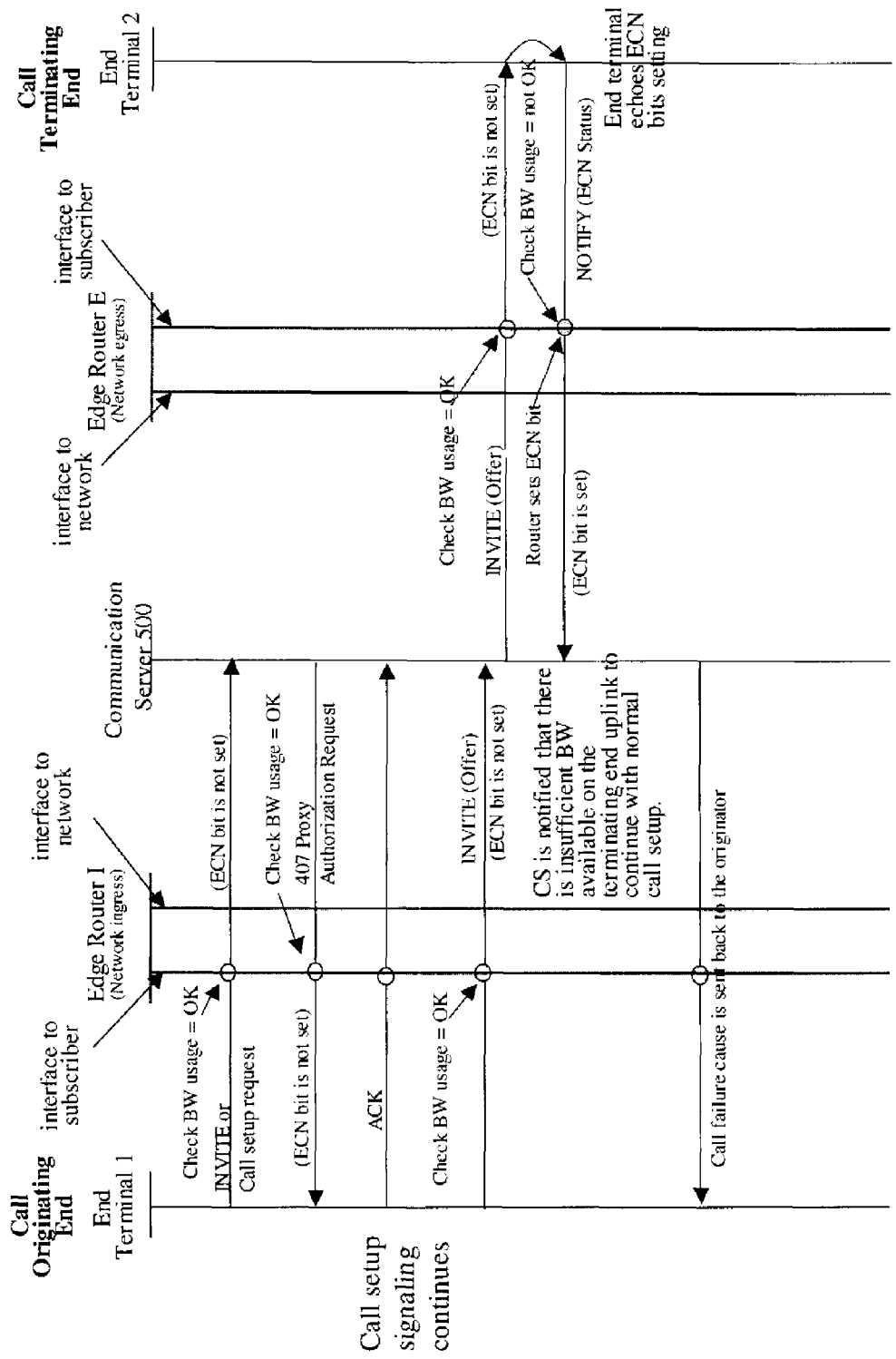
FIG. 7 is a schematic illustration of yet another admission control scenario in accordance with an embodiment of the present invention.

FIG. 7 illustrates a scenario where the uplink is congested on the call terminating end (End Terminal 2). The signaling packets sent by Voice Terminal 1 may travel to and from the Communication Server 500 without being marked by Edge Router I, which indicates that neither uplink nor downlink on the call originating end is congested. As call setup continues, the INVITE (Offer) message sent by End Terminal 1 may be forwarded to the call terminating end. Since the downlink is not congested, ECN bits are not set. End Terminal 2 may echo the ECN settings in the INVITE (Offer) messages to the NOTIFY messages it subsequently sends to Server 500. When the NOTIFY message passes through Edge Router E, their ECN bits may be marked if the ingress link of Edge Router E is congested. Upon examining the NOTIFY message, Communication Server 500 may become notified of the congestion on the call terminating end. The call setup process may be discontinued and the failure cause may be sent to End Terminal 1.

Figure 8:
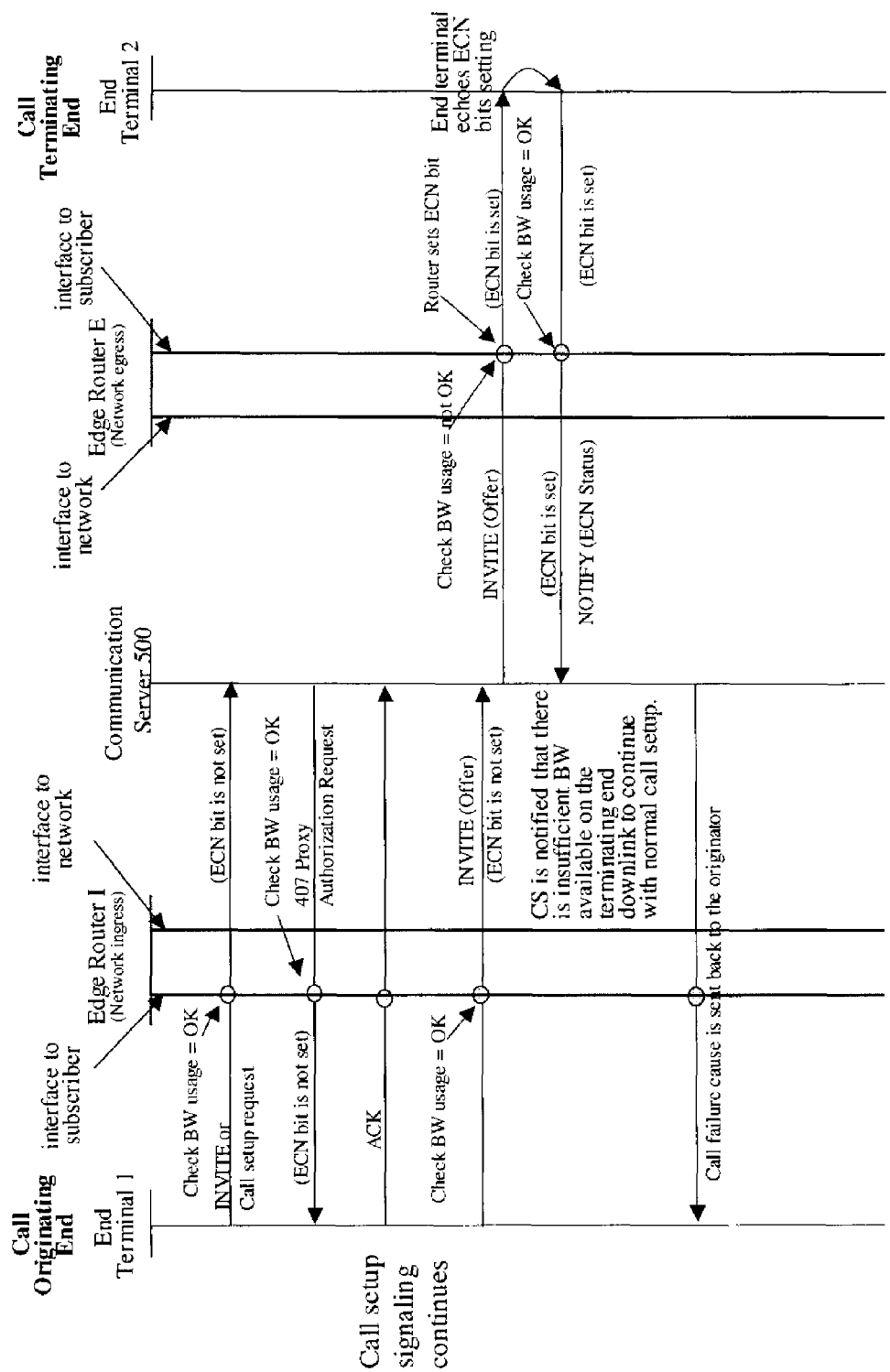
FIG. 8 is a schematic illustration of still another admission control scenario in accordance with an embodiment of the present invention.

FIG. 8 illustrates a scenario where the downlink is congested on the call terminating end. The signaling packets sent by Voice Terminal 1 may travel to and from the Communication Server 500 without being marked by Edge Router I, which indicates that neither uplink nor downlink on the call originating end is congested. As call setup continues, the INVITE (Offer) message sent by End Terminal 1 may be forwarded to the call terminating end. Similar to Edge Router I, Edge Router E may monitor not only ingress flows but also egress flows on its interface to the subscriber. If the egress flows exceed a predetermined maximum rate, Edge Router B may mark the INVITE (Offer) message that are being forwarded towards End Terminal 2. End Terminal 2 may echo the ECN bit settings in a subsequent transmission of NOTIFY messages. When Communication Server 500 examines these subsequently transmitted NOTIFY messages, it may become notified of the congestion on the downlink. Then the call setup may be discontinued and End Terminal 1 may be notified of the failure cause.

At this point it should be noted that the technique for admission control of packet flows in accordance with the present invention as described above typically involves the processing of input data and the generation of output data to some extent. This input data processing and output data generation may be implemented in hardware or software. For example, specific electronic components may be employed in a computer and/or communications network or similar or related circuitry for implementing the functions associated with admission control of packet flows in accordance with the present invention as described above. Alternatively, one or more processors operating in accordance with stored instructions may implement the functions associated with admission control of packet flows in accordance with the present invention as described above. If such is the case, it is within the scope of the present invention that such instructions may be stored on one or more processor readable carriers (e.g., a magnetic disk), or transmitted to one or more processors via one or more signals.

The present invention is not to be limited in scope by the specific embodiments described herein. Indeed, other various embodiments of and modifications to the present invention, in addition to those described herein, will be apparent to those of ordinary skill in the art from the foregoing description and accompanying drawings. Thus, such other embodiments and modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

The invention claimed is:

1. A method of determining whether to set up a real time communication session on a packet data network, the method comprising:
   receiving a real time communication session set-up request from a session originating terminal at an ingress edge router of the packet data network;
   determining a measure of bandwidth usage at the ingress edge router;
   sending at least one signaling packet from the ingress edge router to a communication server connected to the packet network, the at least one signaling packet having an explicit congestion notification (ECN) indicator set to a particular value when the determined bandwidth usage measure exceeds an ingress threshold; and
   responsive to receipt of the at least one signaling packet having its ECN indicator set to the particular value at the communication server, sending a message to the originating terminal indicating that the session set-up request is refused.

2. The method of claim 1, further comprising:
   determining a measure of bandwidth usage at an egress edge router serving a session terminating terminal;
   sending at least one other signaling packet from the egress edge router to the communication server, the at least one other signaling packet having its explicit congestion notification (ECN) indicator set to a particular value when the determined bandwidth usage measure exceeds an egress threshold; and
   responsive to receipt of the at least one other signaling packet having its ECN indicator set to the particular value at the communication server, sending a message to the originating terminal indicating that the session set-up request is refused.

3. The method of claim 2, further comprising operating the communication server to set up a real time communication session between the session originating terminal and the session terminating terminal when the communication server receives no signaling packets having their respective ECN indicator set to a value indicating that one of the ingress threshold and the egress threshold are exceeded during a call set up process.

4. The method of claim 1, wherein the determined measure of bandwidth usage measures usage of bandwidth allocated to real time communication sessions.

5. The method of claim 4, wherein the determined measure of bandwidth usage measures usage of bandwidth allocated to voice calls.

6. The method of claim 1, wherein the at least one signaling packet sent from the ingress edge router to the communication server comprises a call set up request with its ECN indicator set to the particular value when the bandwidth usage measure determined at the ingress edge router exceeds the ingress threshold.

7. The method of claim 6, wherein the at least one signaling packet sent from the ingress edge router to the communication server further comprises an acknowledgement with its ECN indicator set to the particular value when the bandwidth usage measure determined at the ingress edge router exceeds the ingress threshold.

8. The method of claim 2, wherein the at least one other signaling packet sent from the egress edge router to the communication server comprises an ECN status notification with its ECN indicator set to the particular value when the bandwidth usage measure determined at the egress edge router exceeds the egress threshold.

9. The method of claim 1, wherein measures of bandwidth usage both into and out of the packet data network are determined at the ingress router and the at least one signaling packet with its ECN indicator set to the particular value is sent to the communication server when the determined bandwidth usage measure exceeds the ingress threshold.

10. The method of claim 2, wherein measures of bandwidth usage both into and out of the packet data network are determined at the egress router and at least one other signaling packet with its ECN indicator set to the particular value is sent to the communication server when the determined bandwidth usage measure exceeds the egress threshold.

11. The method of claim 1, wherein determining the measure of bandwidth usage comprises measuring a flow rate of packets of a specific packet class that traverse the ingress edge router toward the packet data network.

12. The method of claim 11, further comprising determining the class of a packet traversing the ingress edge router using the Differentiated Services Code Point (DSCP) in a header of the packet.

13. The method of claim 2, wherein determining the measure of bandwidth usage comprises measuring a flow rate of packets of a specific packet class that traverse the egress edge router from the packet data network.

14. The method of claim 13, further comprising determining the class of a packet traversing the egress edge router using the Differentiated Services Code Point (DSCP) in a header of the packet.

15. A system for determining whether to set up a real time communication session on a packet data network, the system comprising:
   an ingress edge router configured:
      to receive a real time communication session set-up request from a session originating terminal at an ingress edge of the packet data network;
      to determine a measure of bandwidth usage at the ingress edge router; and
      to transmit at least one signaling packet, the at least one signaling packet having an explicit congestion notification (ECN) indicator set to a particular value when the determined bandwidth usage measure exceeds an ingress threshold; and
   a communication server connected to the packet data network and configured:
      to receive the at least one signaling packet; and
      responsive to receipt of at least one signaling packet having its ECN indicator set to the particular value, to send a message to the originating terminal indicating that the session set-up request is refused.

16. The system of claim 15, further comprising:
   an egress edge router serving a session terminating terminal and configured:
      to determine a measure of bandwidth usage at the egress edge router;
      to send at least one other signaling packet from the egress edge router to the communication server, the at least one other signal packet having its explicit congestion notification (ECN) indicator set to a particular value when the determined bandwidth usage measure exceeds an egress threshold;
   wherein the communication server is responsive to receipt of at least one signaling packet having its ECN indicator set to the particular value to send a message to the originating terminal indicating that the session set-up request is refused.

17. The system of claim 16, wherein the communication server is configured to set up a real time communication session between the session originating terminal and the session terminating terminal when the communication server receives no signaling packets having their respective ECN indicator set to a value indicating that one of the ingress threshold and the egress threshold are exceeded during a call set up process.

18. The system of claim 15, wherein the determined measure of bandwidth usage measures bandwidth allocated to real time communication sessions.

19. The system of claim 18, wherein the determined measure of bandwidth usage measures bandwidth allocated to voice calls.

20. The system of claim 15, wherein the at least one signaling packet sent from the ingress edge router to the communication server comprises a call set up request with its ECN indicator set to the particular value when the bandwidth usage measure determined at the ingress edge router exceeds the ingress threshold.

21. The system of claim 20, wherein the at least one signaling packet sent from the ingress edge router to the communication server further comprises an acknowledgement with its ECN indicator set to the particular value when the bandwidth usage measure determined at the ingress edge router exceeds the ingress threshold.

22. The system of claim 16, wherein the at least one other signaling packet sent from the egress edge router to the communication server comprises its ECN status notification with an ECN indicator set to the particular value when the bandwidth usage measure determined at the egress edge router exceeds the egress threshold.

23. The system of claim 15, wherein the ingress edge router is configured to determine measures of bandwidth usage both into and out of the packet data network and to send the at least one signaling packet with its ECN indicator set to the particular value to the communication server when the determined measure of bandwidth usage exceeds the ingress threshold.

24. The system of claim 16, wherein the egress edge router is configured to determine measures of bandwidth usage both into and out of the packet data network and to send the at least one other signaling packet with its ECN indicator set to the particular value to the communication server when the determined measure of bandwidth usage exceeds the egress threshold.

25. The system of claim 15, wherein the ingress edge router is configured to determine a measure of bandwidth usage by measuring a flow rate of packets of a specific packet class that traverse the ingress edge router toward the packet data network.

26. The system of claim 25, wherein the ingress edge router is configured to determine the class of a packet traversing the ingress edge router using the Differentiated Services Code Point (DSCP) in a header of the packet.

27. The system of claim 16, wherein the egress edge router is configured to determine the measure of bandwidth usage by measuring a flow rate of packets of a specific packet class that traverse the egress edge router from the packet data network.

28. The system of claim 27, wherein the egress edge router is configured to determine the class of a packet traversing the egress edge router using the Differentiated Services Code Point (DSCP) in a header of the packet.

29. An edge router for a packet data network, comprising:
at least one receiver configured to receive a real time communication session set up request from an originating terminal;
a bandwidth usage monitor configured to determine a measure of bandwidth usage and to compare the determined measure of bandwidth usage with a threshold; and
at least one transmitter configured to transmit at least one signaling packet to a communication server, the at least one signaling packet having an explicit congestion notification (ECN) indicator set to a particular value when the determined measure of bandwidth usage exceeds the threshold.

30. The edge router of claim 29, wherein:
the at least one receiver is further configured to receive a response to the at least one signaling packet from the communication server; and
the at least one transmitter is further configured to send a response to the originating terminal in response to the response received from the communication server.

31. The edge router of claim 30, wherein:
the at least one receiver is further configured to receive an acknowledgement of the response sent to the originating terminal; and
the at least one transmitter is further configured to send at least one further signaling packet to the communication server in response to the acknowledgement received from the originating terminal, the at least one further signaling packet having an explicit congestion notification (ECN) indicator when the determined measure of bandwidth usage exceeds the threshold.

32. The edge router of claim 29, wherein:
the at least one receiver is further configured to receive a real time communication session set up request from the communication server;
the at least one transmitter is further configured to transmit a real time communication session set up request to a terminating terminal in response to receipt of the communication session set up request from the communication server;
the at least one receiver is further configured to receive a response to the communication session set up request from the terminating terminal; and
the at least one transmitter is configured to transmit at least one signaling packet to the communication server in response to the receipt of the response from the terminating terminal, the at least one signaling packet having its explicit congestion notification (ECN) indicator when the determined measure of bandwidth usage exceeds the threshold.

33. The edge router of claim 29, wherein:
the at least one receiver is further configured to receive a communication session failure message from the communication server; and
the at least one transmitter is further configured to send another communication session failure message to the originating terminal in response to the communication session failure message received from the communication server.

34. The edge router of claim 29, wherein:
the bandwidth usage monitor is configured to determine a measure of bandwidth usage both into and out of the packet data network and to compare both the measure of bandwidth usage into the packet data network and the measure of bandwidth usage out of the packet data network with the threshold; and
the at least one transmitter is configured to transmit the at least one signaling packet to a communication server, the at least one signaling packet having its explicit congestion notification (ECN) indicator set to a particular value when one of the determined measure of bandwidth usage into the packet data network and the determined measure of bandwidth usage out of the packet data network exceeds the threshold.

35. The edge router of claim 29, wherein the bandwidth usage monitor is configured to determine the measure of bandwidth usage by measuring a flow rate of packets of a specific packet class that traverse the edge router toward the packet data network.

36. The edge router of claim 35, wherein the bandwidth usage monitor is configured to determine the class of a packet traversing the ingress edge router using the Differentiated Services Code Point (DSCP) in a header of the packet.

37. The edge router of claim 34, wherein the bandwidth usage monitor is configured to determine a measure of bandwidth usage by measuring a flow rate of packets of a specific packet class that traverse the edge router from the packet data network.

38. The edge router of claim 37, wherein the bandwidth usage monitor is configured to determine the class of a packet traversing the egress edge router using the Differentiated Services Code Point (DSCP) in a header of the packet.

39. A method of operating an edge router for a packet data network, comprising:
receiving a real time communication session set up request from an originating terminal;
determining a measure of bandwidth usage and comparing the determined measure of bandwidth usage with a threshold; and
transmitting at least one signaling packet to a communication server, the at least one signaling packet having an explicit congestion notification (ECN) indicator when the determined measure of bandwidth usage exceeds the threshold.

40. The method of claim 39, further comprising:
receiving a response to the at least one signaling packet from the communication server; and
sending a response to the originating terminal in response to the response received from the communication server.

41. The method of claim 40, further comprising:
receiving an acknowledgement of the response sent to the originating terminal; and
sending at least one further signaling packet to the communication server in response to the acknowledgement received from the originating terminal, the at least one further signaling packet having the explicit congestion notification (ECN) indicator when the determined measure of bandwidth usage exceeds the threshold.

42. The method of claim 39, further comprising:
receiving a real time communication session set up request from the communication server;
transmitting another real time communication session set up request to a terminating terminal in response to receipt of the communication session request from the communication server;
receiving a response to the communication session set up request from the terminating terminal; and
transmitting at least one signaling packet to the communication server in response to the receipt of the response from the terminating terminal, the at least one signaling packet having the explicit congestion notification (ECN) indicator when the determined measure of bandwidth usage exceeds the threshold.

43. The method of claim 39, further comprising:
receiving a communication session failure message from the communication server; and
sending another communication session failure message to the originating terminal in response to the communication session failure message received from the communication server.

44. The method of claim 39, wherein:
determining the measure of bandwidth usage comprises determining measures of bandwidth usage both into and out of the packet data network;
comparing the determined measure of bandwidth usage to a threshold comprises comparing both the determined measure of bandwidth usage into the packet data network and the determined measure of bandwidth usage out of the packet data network with the threshold; and
transmitting at least one signaling packet to a communication server comprises transmitting at least one signaling packet having its explicit congestion notification (ECN) indicator set to a particular value when its of the determined measure of bandwidth usage into the packet data network and the determined measure of bandwidth usage out of the packet data network exceeds the threshold.

45. The method of claim 39, wherein determining a measure of bandwidth usage comprises measuring a flow rate of packets of a specific packet class that traverse the edge router toward the packet data network.

46. The method of claim 45, comprising determining the class of a packet traversing the ingress edge router using the Differentiated Services Code Point (DSCP) in a header of the packet.

47. The method of claim 44, wherein determining the measure of bandwidth usage comprises measuring a flow rate of packets of a specific packet class that traverse the edge router from the packet data network.

48. The method of claim 47, comprising determining the class of a packet traversing the egress edge router using the Differentiated Services Code Point (DSCP) in a header of the packet.

49. A communication server for setting up real time communication sessions over a packet data network, comprising:
a receiver configured to receive a real time communication session set up request from an originating terminal via an ingress edge router of the packet data network, the real time communication set up request comprising at least one signaling packet comprising an explicit congestion notification (ECN) indicator; and
a transmitter configured to send a communication session failure message to the originating terminal via the ingress edge router when the ECN indicator has a particular value indicating congestion at the ingress edge router.

50. The communication server of claim 49, wherein:
the transmitter is further configured to send a real time communication session request to a terminating terminal via an egress edge router of the packet data network in response to the communication session request from the originating terminal;
the receiver is further configured to receive a response from the terminating terminal via the egress edge router, the response comprising at least one other signaling packet comprising another ECN indicator; and
a transmitter is further configured to send a communication session failure message to the originating terminal via the ingress edge router when the another ECN indicator has a particular value indicating congestion at the egress edge router.

51. A method of operating a communication server configured to set up real time communication sessions over a packet data network, the method comprising:
receiving the real time communication session set up request from an originating terminal via an ingress edge router of the packet data network, the real time communication set up request comprising at least one signaling packet comprising an explicit congestion notification (ECN) indicator; and sending the communication session failure message to the originating terminal via the ingress edge router when the ECN indicator has a particular value indicating congestion at the ingress edge router.

52. The method of claim 51, further comprising:

sending a real time communication session request to a terminating terminal via an egress edge router of the packet data network in response to the communication session set up request from the originating terminal;

receiving a response from the terminating terminal via the egress edge router, the response comprising at least one other signaling packet comprising another ECN indicator; and sending another communication session failure message to the originating terminal via the ingress edge router when the another ECN indicator has a particular value indicating congestion at the egress edge router.

53. A terminal for real time communication sessions over a packet data network, the terminal comprising:

at least one receiver configured to receive at least one signaling packet from an edge router of the packet data network, the signaling packet comprising an explicit congestion notification (ECN) indicator; and at least one transmitter configured to transmit at least one other signaling packet to the edge router of the packet data network in response to the signaling packet received from the edge router, the transmitted at least one other signaling packet comprising an ECN indicator echoing the ECN indicator of the received signaling packet.

54. A method of operating a terminal for real time communication sessions over a packet data network, the method comprising:

receiving at least one other signaling packet from an edge router of the packet data network, the signaling packet comprising an explicit congestion notification (ECN) indicator; and transmitting at least one other signaling packet to the edge router of the packet data network in response to the signaling packet received from the edge router, the transmitted at least one other signaling packet comprising an ECN indicator echoing the ECN indicator of the received signaling packet.

* * * * *